United States Patent [19]

Noguchi et al.

[11] 3,981,145
[45] Sept. 21, 1976

[54] DEVICE FOR PURIFYING EXHAUST GASES BY CATALYTIC REACTION

[75] Inventors: Masaaki Noguchi; Tsuchio Bunda; Masaharu Sumiyoshi, all of Aichi, Japan

[73] Assignee: Toyota Jidosha Kogyo Kabushiki Kaisha, Toyota, Japan

[22] Filed: Dec. 31, 1974

[21] Appl. No.: 537,778

[30] Foreign Application Priority Data

Apr. 3, 1974 Japan................................ 49-38185

[52] U.S. Cl................................ 60/288; 23/288 FA; 23/288 FB; 60/289; 60/301; 60/302
[51] Int. Cl.² ........................................... F01N 3/15
[58] Field of Search ............... 60/301, 302, 288, 277, 60/289; 23/288 FB, 288 FA

[56] References Cited
UNITED STATES PATENTS

| | | | |
|---|---|---|---|
| 3,733,181 | 5/1973 | Tourtellotte | 60/301 |
| 3,793,830 | 2/1974 | August | 60/301 |
| 3,824,788 | 7/1974 | Cole | 60/301 |
| 3,853,483 | 12/1974 | Cross | 60/301 |
| 3,902,853 | 9/1975 | Marsee | 60/301 |

*Primary Examiner*—Douglas Hart
*Attorney, Agent, or Firm*—Stevens, Davis, Miller & Mosher

[57] ABSTRACT

An exhaust gas purification apparatus for a vehicle in which exhaust gases from an internal combustion engines are subject to a catalytic reaction in a reducing catalyst bed and an oxidizing catalyst bed to remove nitrogen oxides and combustible constituents in the engine exhaust gases. In the device, the reducing catalyst bed and oxidizing catalyst bed are disposed in series in the flowing direction of exhaust gases within a cylindrical casing mounted integrally to a joining portion of exhaust manifold, and secondary air supplying means is provided when the exhaust gas temperature at a point downstream of the catalyst beds is lower than a predetermined setting. A passage for connecting the joining portion of the exhaust manifold directly with an exhaust pipe is provided, and a valve means is disposed in this passage to be opened to pass the exhaust gases through this passage when the exhaust gas temperature detected by a temperature detector mounted to the exhaust pipe is higher than the predetermined setting.

14 Claims, 5 Drawing Figures

DEVICE FOR PURIFYING EXHAUST GASES BY CATALYTIC REACTION

BACKGROUND OF THE INVENTION

This invention relates to a device for purifying exhaust gases from internal combustion engines, and more particularly to a device for use in a vehicle for purifying engine exhaust gases by a catalytic reaction so as to remove nitrogen oxides and combustible components in the exhaust gases.

It is commonly known that exhaust gases discharged from an internal combustion engine contain harmful components, for example, oxides such as nitrogen oxides $NO_x$ and combustible matters or products of incomplete combustion such as hydrocarbons and carbon monoxide, and these harmful components give rise to a serious social problem as they pollute the atmosphere. It is necessary to subject exhaust gases to reduction in order to remove $NO_x$, and it is necessary to subject exhaust gases to oxidation in order to remove HC and CO. Various exhaust gas purification apparatus have been studied and proposed hitherto in an effort to remove these harmful components. Catalysts are commonly employed for attaining smooth and reliable reduction and oxidation of these harmful exhaust gaseous components and improving the efficiency of exhaust gas purification.

A so-called overall purifying device for purifying exhaust gases from an internal combustion engine of a vehicle has been proposed in an attempt to remove all of the harmful components including $NO_x$, HC and CO contained in the engine exhaust gases. The proposed device comprises a catalytic reduction unit disposed in the vicinity of the engine for removing $NO_x$ by reduction and a catalytic oxidation unit disposed at a position rearward of the engine, for example, beneath the floor of the vehicle for removing HC and CO by oxidation. In order that purification of the exhaust gases can be more completely attained, the efficiency of exhaust gas purification must be improved in such various engine operating conditions as starting, acceleration and deceleration where the concentration of harmful components is especially high. To this end, it is necessary to supply secondary air and control, for example, the flow properties of exhaust gases depending on the operating condition of the engine. However, provision of such a plurality of independent catalytic units is undesirable in view of the complexity of structure. Further, it is necessary to maintain the temperature of exhaust gases introduced into the catalytic units at a sufficiently high level so as to improve the conversion efficiency during starting of the engine. From this standpoint too, it is desirable to dispose the catalytic units closer to the engine.

SUMMARY OF THE INVENTION

With a view to obviate prior art defects as pointed out above, it is a primary object of the present invention to provide a novel and improved device which is suitable for purifying exhaust gases from an internal combustion engine by a catalytic reaction, which can efficiently purify the exhaust gases even in the engine starting stage, which ensures most suitable purification of the exhaust gases in all the operating conditions of the engine in spite of variations of the exhaust gas temperature, and which can protect the catalysts against damage and deterioration due to unusually high exhaust gas temperatures. According to the present invention, a reducing catalyst bed and an oxidizing catalyst bed are disposed in series within a casing mounted integrally to a joining portion of engine exhaust manifold, and means for supplying secondary air required to purify the exhaust gases by oxidation is disposed between the reducing catalyst bed and the oxidizing catalyst bed, so that $NO_x$ can be converted into $N_2$ by the reducing catalyst bed disposed on the upstream side, and HC and CO can be converted into $H_2O$ and $CO_2$ by the oxidizing catalyst bed disposed on the downstream side. Further, a bypass passage bypassing these catalyst beds is provided within the casing, and a valve means is disposed in this bypass passage to be opened when the exhaust gas temperature is higher than a predetermined setting so as to prevent any further proceeding of the catalytic reaction.

Other and further objects, features and advantages of the present invention will appear more fully from the following detailed description taken in conjunction with the accompanying drawings.

DESCRIPTION OF THE PREFERRED EMBODIMENTS

Figure 1:
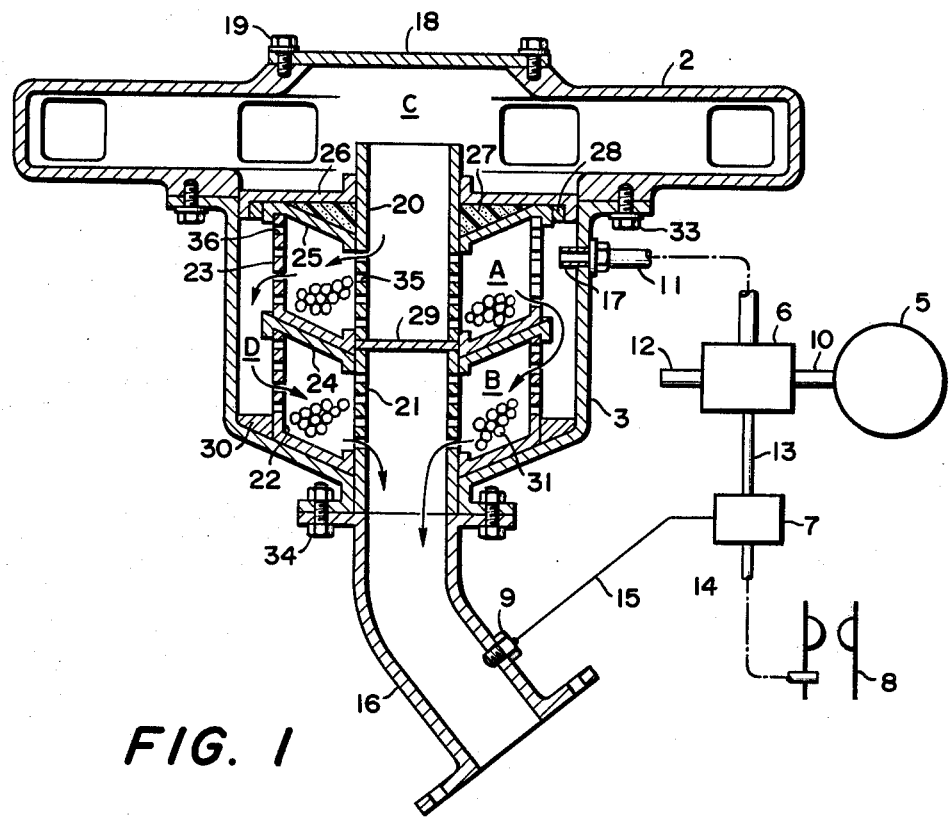
FIG. 1 is a schematic vertical sectional view of a first embodiment of the exhaust gas purifying device according to the present invention.
Figure 2:
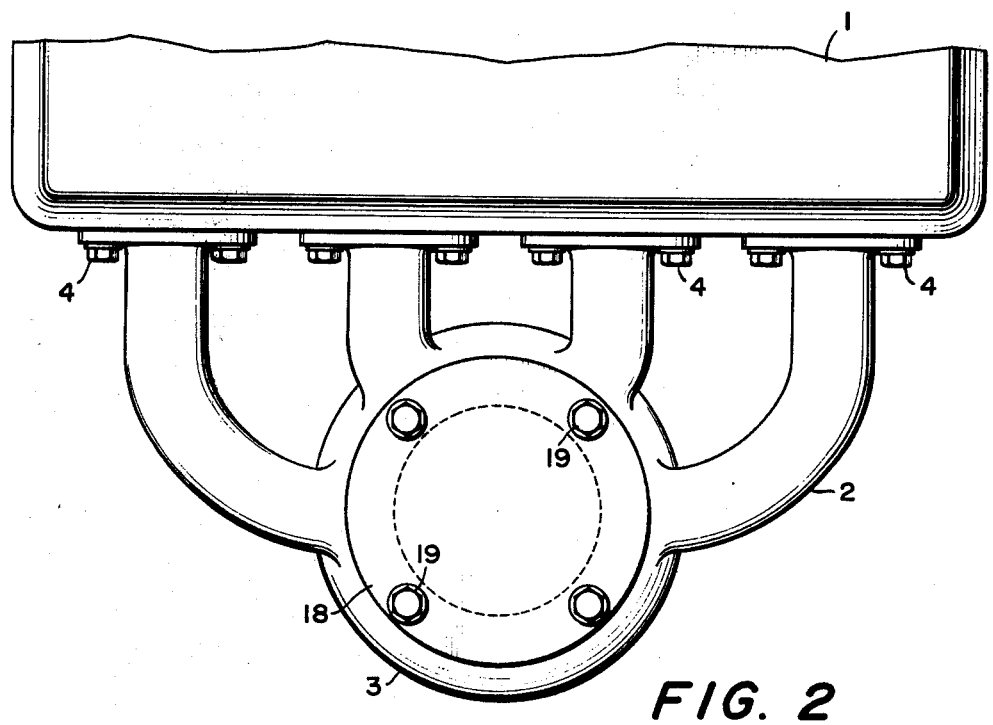
FIG. 2 is a plan view of parts of the device shown in FIG. 1.

Referring to FIGS. 1 and 2 showing a first embodiment of the present invention, the body of an internal combustion engine mounted in a vehicle is generally designated by the reference numeral 1, and exhaust manifold 2 whose number of branches corresponds to the number of cylinders of the engine is mounted to the engine body 1 by bolts 4. A hollow cylindrical casing 3 extends downward from a joining portion of the exhaust manifold 2 and is securely fixed to such portion by bolts 33. The hollow cylindrical casing 3 has a bottom wall which inclines gradually downward toward the center of the casing 3 to support a bottom wall of a lower catalyst container described later. The lower end of the hollow cylindrical casing 3 is connected to an exhaust pipe 16 by bolts 34, and engine exhaust gases pass through this exhaust pipe 16 and then through a muffler (not shown) to be discharged to the atmosphere. To the upper part of a chamber C defined within the joining portion of the exhaust manifold 2, a cover member 28 is detachably fixed by bolts 19.

A lower catalyst container 22 and an upper catalyst container 23 are disposed within the hollow cylindrical casing 3 in such a relationship that these containers 22 and 23 are vertically superposed to register with each other in the axial direction of the casing 3. The lower catalyst container 22 has its bottom wall inclined gradually downward toward the center thereof, and this bottom wall is supported on or in engagement with the downwardly inclining bottom wall of the hollow cylindrical casing 3. The upper catalyst container 23 has its bottom wall inclined gradually downward toward the center thereof, and this bottom wall is supported on or in engagement with a partition plate 24 which inclines similarly gradually downward toward the center of the container 23 to form an upper wall of the lower catalyst container 22. A mass of a conventional catalyst 31 is charged in each of these lower and upper catalyst containers 22 and 23 to constitute a reducing catalyst bed A and an oxidizing catalyst bed B respectively which are arranged in series in the flowing direction of exhaust gases as shown in FIG. 1.

An air injection nozzle 17 for injecting secondary air for oxidation extends into an annular space D defined between the side wall of the hollow cylindrical casing 3 and outer walls of the lower and upper catalyst containers 22 and 23. The secondary air is supplied from an air pump 5 and passes through a pipe 10 into a change-over valve 6. After being controlled by the change-over valve 6, the secondary air passes through a pipe 11 to be injected from the secondary air injection nozzle 17 into the annular space D at a point upstream of the oxidizing catalyst bed B. The change-over valve 6 is actuated by the negative pressure in a suction pipe 8 of the engine. A temperature sensor 9 is mounted to the exhaust pipe 16 for detecting the temperature of exhaust gases and applies a temperature signal to a solenoid valve 7 through a lead wire 15. When the exhaust gas temperature exceeds a predetermined setting, the solenoid valve 7 is energized to supply the negative pressure in the suction pipe 8 to the change-over valve 6 by way of pipes 13 and 14. The change-over valve 6 is actuated so that the flow of secondary air supplied from the air pump 5 is changed over from the pipe 11 to a pipe 12 to be discharged to the atmosphere or to a suitable portion of the vehicle. Thus, no secondary air is supplied to the oxidizing catalyst bed B any more in such a case.

The mass of the catalyst 31 is charged in the catalyst containers 22 and 23 as above described. The partition plate 24 is disposed between the catalyst containers 22 and 23, and a cover member 25 is mounted on the upper end of the catalyst container 23 to form an upper wall of the container 23. A pair of axially aligned hollow tubular members 21 and 20 extend vertically along the central axis of the catalyst containers 22 and 23 to form inner walls of theses containers. The hollow tubular member 20 extends at the upper end thereof into the chamber C defined within the joining portion of the exhaust manifold 2 to communicate with the chamber C, and the exhaust pipe 16 is connected to the lower end of the hollow tubular member 21 as an extension of the latter. The catalyst container 22 is fixed against radial movement by a suitable means 30 disposed on a lower outer peripheral portion thereof, and an annular member 26 is mounted on the upper wall 25 of the catalyst container 23 with a shock absorbing material 27 interposed therebetween to securely hold the catalyst containers 22, 23 and the hollow tubular members 20, 21 in position. A separating plate 29 is disposed between the hollow tubular members 20 and 21 to prevent communication therebetween. This separating plate 29 acts also as a deflecting means for directing the exhaust gas flow from the chamber C into the catalyst container 23. Many perforations 36 and 35 are bored in the side walls of the catalyst containers 22, 23 and hollow tubular members 20, 21 respectively to permit passage of exhaust gases therethrough. The type of these perforations 35 and 36 is preferably selected to have a suitable shape and size compared with the pellet size of the catalyst 31.

The operation of the first embodiment of the present invention having such a structure will now be described. Exhaust gases produced in the engine pass through the exhaust manifold 2 into the chamber C defined within the joining portion of the exhaust manifold 2, thence into the hollow tubular member 20. From the hollow tubular member 20, the exhaust gases pass through the perforations 35 to enter the reduction catalyst bed A. Since the exhaust gases entering the reducing catalyst bed A have been just discharged from the combustion chambers of the engine and have a sufficiently high temperature, the exhaust gases react immediately with the catalyst 31. However, due to the fact that no secondary air is supplied to this portion of the device, reduction of $NO_x$ in the exhaust gases takes place and $NO_x$ is reduced to $N_2$. Thus, $NO_x$ in the exhaust gases can be converted to $N_2$ and oxygen, while the exhaust gases pass through the reducing catalyst bed A. Then, the exhaust gases flow in a direction as shown by the arrow to pass through the perforations 36 in the outer wall of the catalyst container 23 into the annular space D defined between the casing 3 and the catalyst containers 22 and 23. Secondary air is supplied from the air pump 5 into thes annular space D by the injection nozzle 17. The exhaust gases, whose temperature is raised further by the reaction with the catalyst 31 in the reducing catalyst bed A, pass through the perforations 36 in the outer wall of the catalyst container 22 to enter the oxidizing catalyst bed B together with the secondary air. In the oxidizing catalyst bed B, oxidation of the exhaust gases takes place extensively, and HC and CO in the exhaust gases are converted to $H_2O$ and $CO_2$. In this manner, $NO_x$, HC and CO are converted into harmless $N_2$, $H_2O$ and $CO_2$ while the exhaust gases flow through the compact hollow cylindrical casing 3 in which the two catalyst containers 22 and 23 are housed, and the exhaust gases rendered harmless are discharged through the exhaust pipe 16 to the atmosphere.

When the engine is forced to operate under a heavy load over an extended period of time, exhaust gases in a large quantity are subject to the catalytic reaction and the catalyst is heated up to an unusually high temperature. In such a case, the temperature of the exhaust gases passing through the exhaust pipe 16 becomes also higher. When the temperature sensor 9 detects such an unusually high exhaust gas temperature, the solenoid valve 7 is energized and the secondary air supplied from the air pump 5 is discharged to the atmosphere under control of the change-over valve 6. Since, in this case, no secondary air is supplied into the oxidizing catalyst bed B by the injection nozzle 17, any substantial oxidizing reaction does not take place in the oxidizing catalyst bed B and any appreciable heat is not generated. This manner of controlling the supply of secondary air before the catalyst is heated up to an unusually high temperature is advantageous in preventing the loss of the exhaust gas purifying function due to damage to and deterioration of the catalyst as well as damage to the catalyst containers resulting from exposure to an unusually high temperature.

It will be understood that the present invention employs a radial flow system in the oxidizing catalyst bed B. That is, exhaust gases flow through the oxidizing catalyst bed B in a radial direction and the direction of flow of the exhaust gases is radially inward from outside. This is advantageous in improving the durability and purification performance of the catalyst as described below. In the case of the reducing catalyst bed, there is no restriction in the direction of flow of exhaust gases through the reducing catalyst bed, but in the case of the oxidizing catalyst bed, different results are obtained in the durability and purification performance of the catalyst itself depending on the direction of flow of exhaust gases. The results are also different when compared with an axial flow system in which exhaust gases flow through the cylindrical catalyst bed in an axial direction.

These differences will be discussed in more detail. In the case of the axial flow, an increased weight loss of the catalyst tends to occur since the catalyst pellets have an increased tendency toward crushing and attrition due to thermal contraction and impingement therebetween or impingement against the container walls by the acceleration imparted by vibrations of the vehicle and engine. Especially when the direction of flow of exhaust gases is such that the catalyst beads are blown up against gravity, the weight loss is further promoted until finally the pulverized catalyst may be discharged into the atmosphere, and this leads to a problem of additional pollution by the scattered catalyst powder. According to an experiment performed to find the exhaust gas purification performance of the axial flow type catalytic oxidation unit which was directly connected to an engine, an endurance test over 25 hours proved that a 28% weight loss occurred in the catalyst (that is, 28% of the catalyst, scattered in the atmosphere), and 14% of the catalyst remaining in the catalyst bed was crushed and pulverized. An experiment similar to that above described was performed on a radial flow type catalytic oxidation unit similar to that used in the present invention in which exhaust gases flow through the oxidizing catalyst bed radially inward from outside of the catalyst bed. The results were quite satisfactory in that any substantial weight loss did not occur in the catalyst even with an endurance test over 100 hours as well as a severe test in which the catalyst was repeatedly cooled and heated. It is considered that such good results can be obtained by the action of the radial flow which urges the catalyst layer always toward the inner wall of the container. Thus, the axial flow type catalytic unit which gives rise to a large weight loss of the catalyst is disadvantageous and it is undesirable to mount such unit in the vicinity of the engine.

The durability and purification performance of the oxidizing catalyst bed when exhaust gases flow radially inward from outside of the catalyst bed differ from those when exhaust gases flow radially outward from inside of the catalyst bed. Generally speaking, the quantity of heat generated in catalyst beads by the reaction due to contact with exhaust gases having a temperature higher than the activation temperature of the catalyst increases with the increase in the amount of exhaust gases flowing into the unit volume of catalyst bed. In other words, heat is generated more when exhaust gases in a greater amount are supplied to a fixed amount of catalyst layer, even if the concentration of the exhaust gases is constant. A portion of the generated heat acts to raise the temperature of the exhaust gases and flows to the downstream side, while the remaining portion of the generated heat is accumulated in the catalyst layer to raise the temperature of the catalyst particles to a level higher than that of the incoming exhaust gases with the result that the catalytic reaction with the exhaust gases subsequently introduced is promoted and generation of heat is also promoted. In this manner, the temperature of the catalyst beads is continuously raised until a saturation point which is dependent upon the factors including the concentration and flow rate of the incoming exhaust gases. Further, presence of oxygen is essentially required for the oxidizing reaction. Thus, the catalytic reaction does not take place uniformly and simultaneously throughout the catalyst bed, and this reaction ceases when all the oxygen has been consumed while the exhaust gases pass through the surfacial four or five layers of the catalyst beads. It will be understood, from the above discussion that heat is generated in a greater quantity in the catalyst beads in contact with the inner wall of the catalyst container when incoming exhaust gases flow radially outward from inside than in the catalyst beads in contact with the outer wall of the catalyst container when incoming exhaust gases flow radially inward from outside, and a higher temperature is obtained, resulting in a higher purification performance. (The higher the reaction temperature, the higher the purification performance.)

An experiment was performed in accordance with the Emission Test procedure (Japanese 10 Mode, Exhaust Gases Regulations) on two radial flow type catalytic units each connected directly to an engine and containing an oxidizing catalyst in the same amount. In one of the units, exhaust gases were directed radially outward from inside, while in the other unit, exhaust gases were directed radially inward from outside. In the former case, the rate of conversion of HC and CO was as high as 85 to 95%, but in the latter case, this rate of conversion was reduced to 70 to 75%. This proves that the radial flow from inside toward outside gives better results than the radial flow from outside toward inside from the standpoint of conversion performance. (That is, the catalyst is required in a less amount in the former case than in the latter case in attaining the same rate of conversion.) However, the radial flow from inside toward outside is undesirable from the standpoint of durability. This is because the exhaust gas temperature itself may become as high as 750° to 800°C depending on the operating conditions of the engine. When exhaust gases reach such a high temperature, in case of radial flow from inside, the temperature of the inner wall portion of the catalyst container may exceed the heat-resisting temperature of the material, resulting in fusion of the catalyst and failure of the material forming the inner wall of the catalyst container.

A durability test was performed on the above-mentioned both radial flow type catalytic units over 150 hours. The test results proved that, in the unit arranged for radial flow from inside, fusion occurred in the catalyst particles close to the inner wall of the catalyst container, while in the unit arranged for radial flow from outside, any substantial fusion and catalyst weight loss did not occur.

The desired conversion performance can be obtained by suitably selecting the amount of the catalyst with consideration about its deterioration. When the catalytic unit is mounted in the vicinity of the engine, incoming exhaust gases can be maintained at a high temperature and the required amount of the catalyst can be correspondingly reduced. When, on the contrary, the catalytic unit is located at a position, for example, underneath the floor of the vehicle as in the conventional practice, it is difficult to maintain incoming exhaust gases at a high temperature and the catalyst is required in a large volume in order to compensate for the decrease of the conversion performance. According to the present invention, the catalytic oxidation unit is disposed so that exhaust gases are directed radially inward from outside. This is advantageous in improving the durability, weight loss, and conversion performance. Further, the exhaust gas purifying device according to the present invention is compact in structure due to the fact that the catalytic oxidation unit is connected integrally with the exhaust manifold and the reducing catalyst bed and the oxidizing catalyst bed are housed within the single casing.

A second embodiment of the present invention will be described with reference to FIG. 3 in which like reference numerals are used to denote like parts appearing in FIG. 1.

Figure 3:
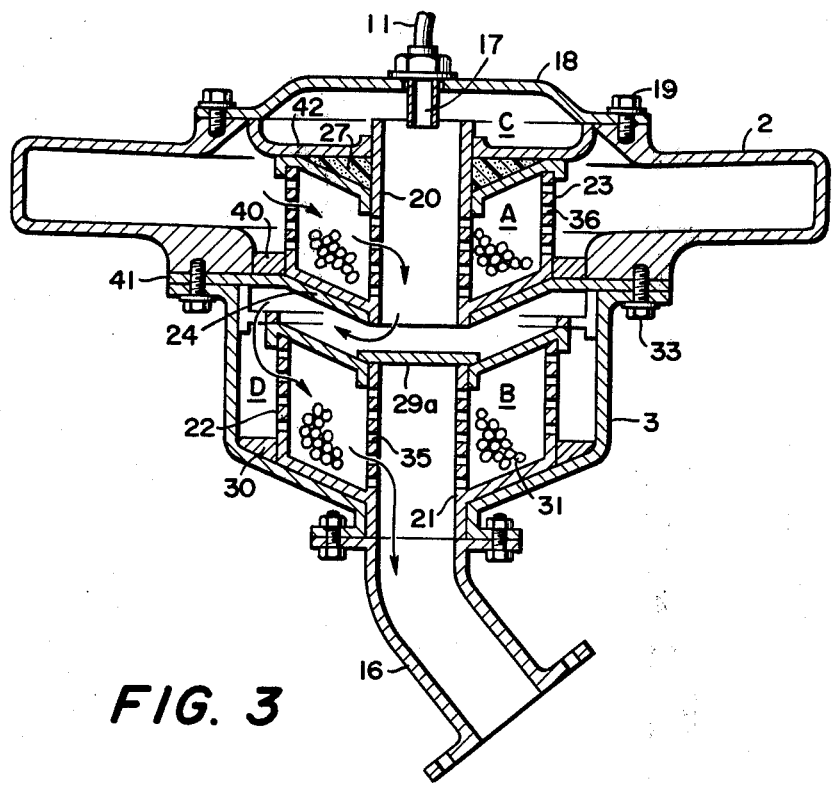
FIG. 3 is a view similar to FIG. 1, but showing a second embodiment of the device according to the present invention.

Referring to FIG. 3, an upper catalyst container 23 and a lower catalyst container 22 each containing a known catalyst 32 constituting a reducing catalyst bed A and an oxidizing catalyst bed B respectively are similarly vertically arranged within a hollow cylindrical casing 3. Both these containers 23 and 22 are of the radial flow type in which exhaust gases flow radially from outside to inside. A member 40 cooperates with a supporting plate 41 for supporting the catalyst container 23 having the reducing catalyst bed A formed therein in a predetermined position. This member 40 serves also as a means for regulating the flow of exhaust gases toward the reducing catalyst bed A. Another member 42 is provided for supporting from above the catalyst container 23 and a perforated hollow tubular member 20 forming an inner wall of the container 23 so that they may not make vertical movement. The catalyst container 22 having the oxidation catalyst bed B formed therein is supported in a manner as described with reference to FIG. 1. A secondary air injection nozzle 17 extends through a cover member 18 covering the joining portion of the exhaust manifold 2 and is disposed at a position registering with the axis of the hollow tubular member 20, so that secondary air can be injected into the hollow tubular member 20. A cover member 29a closes the upper end of a perforated hollow tubular member 21 which forms an inner wall of the catalyst container 22. An exhaust gas passage is defined between the supporting plate 41 supporting the catalyst container 23 and an upper wall 24 of the catalyst container 22, so that exhaust gases leaving the reducing catalyst bed A and impinging against the cover member 29a can be directed radially outward. This passage communicates with an annular space D. These two catalyst containers 22 and 23 have the same construction as in the first embodiment.

In operation, high-temperature exhaust gases discharged from the combustion chambers of the engine pass through perforations 36 bored in the outer wall of the catalyst container 23 to enter the reducing catalyst bed A in the catalyst container 23, and a reducing reaction as described with reference to the first embodiment is carried out. The exhaust gases in which $NO_x$ is reduced to $N_2$ by the reducing reaction are fed into the hollow tubular member 20 to be mixed with secondary air supplied from the air injection nozzle 17 and then flow in a direction as shown by the arrow to pass into the oxidizing catalyst bed B through perforations bored in the outer wall of the catalyst container 22. The exhaust gases maintained still at the high temperature by the reducing reaction are subjected repeatedly to an intense oxidizing reaction in the oxidizing catalyst bed B, and HC and CO in the exhaust gases are oxidized to be converted into $H_2O$ and $CO_2$, the treated exhaust gases being then discharged into an exhaust pipe 16.

In this embodiment, a downward pressure is imparted to the catalyst beads 31 to force these catalyst beads 31 toward the lower part of the hollow tubular members 20 and 21 due to the fact that both the catalyst container 23 and 22 have their bottom walls inclined downward toward the center and exhaust gases are directed radially inward from outside of these catalyst containers 22 and 23.

In a prior art engine exhaust gas purifying device for use in vehicles, there has been a great tendency of attrition toward crushing and weight loss of catalyst particles as a result of impingement between and impartation of vibrations to the catalyst beads since the device is always subjected to vibrations when the vehicle is running. The present invention having the structure above described is advantageous in that undesirable floating of the catalyst beads as well as undesirable impingement between the catalyst particles can be substantially eliminated and the service life of the catalyst can be remarkably extended.

Figure 4:
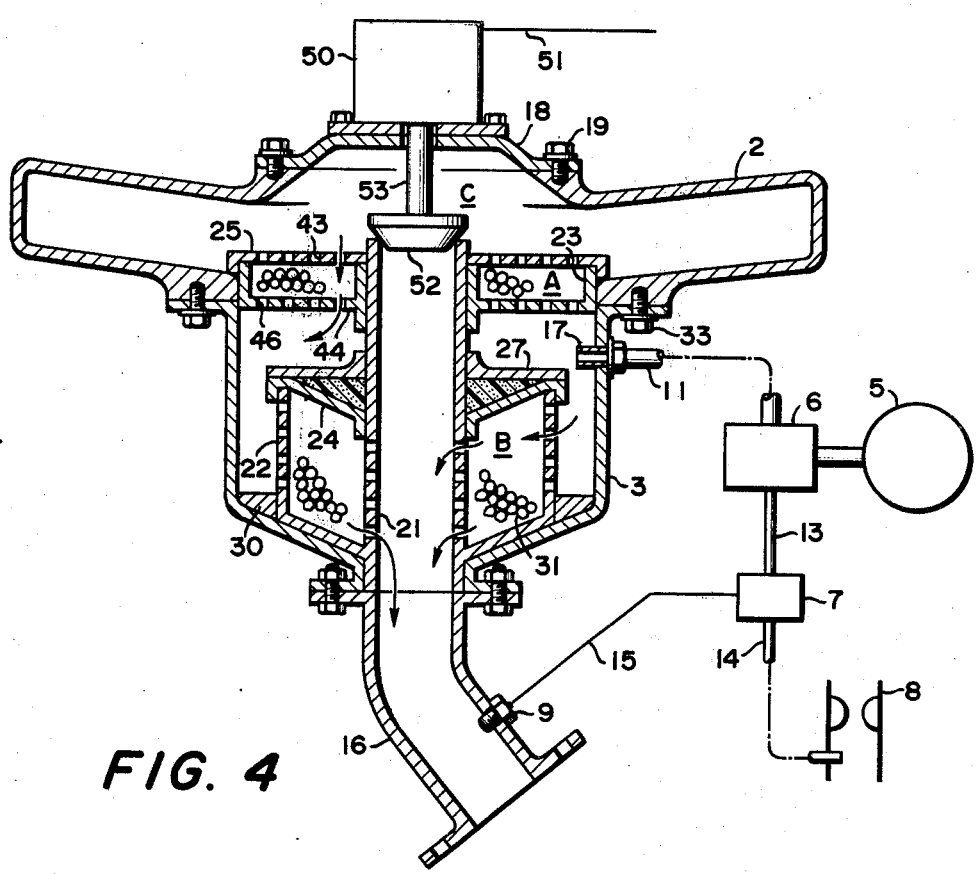
FIGS. 4 and 5 are views similar to FIG. 1, but showing a third and a fourth embodiment of the present invention respectively.

A third embodiment of the present invention is shown in FIG. 4, in which like reference numerals are used to denote like parts appearing in FIG. 1.

Referring to FIG. 4, an upper catalyst container 23 having a reducing catalyst bed A formed therein and a lower catalyst container 22 having an oxidizing catalyst bed B formed therein are similarly vertically arranged within a hollow cylindrical casing 3. The catalyst container 23 having the reducing catalyst bed A formed therein has a horizontally disposed bottom wall 44, and perforations 46 and 43 are bored in the bottom wall 44 and upper wall 25 respectively to permit passage of exhaust gases from an internal combustion engine therethrough. The catalyst container 23 has an inner wall which is not provided with any perforations. The catalyst container 22 having the oxidizing catalyst bed B formed therein has a structure similar to that shown in FIG. 1 except that a hollow tubular member 21 forming an inner wall of the catalyst container 22 extends upward along the inner wall of the catalyst container 23 having the reducing catalyst bed A formed therein to communicate with a chamber C defined within the joining portion of exhaust manifold 2.

A valve means is provided adjacent to the upper end of the hollow tubular member 21 in the chamber C so as to openably close the passage formed in the hollow tubular member 21. This valve means comprises a valve member 52, a valve rod 53, a solenoid 50 for attracting the valve rod 53 when energized, and a lead wire 51 for supplying current to the solenoid 50. When the exhaust gas temperature is unusually higher than a predetermined setting, the entire device including the catalyst beds may be damaged by the high temperature. A temperature sensor 9 is mounted to an exhaust pipe 16 to avoid this damage. When the exhaust gas temperature exceeds the predetermined setting, the temperature sensor 9 generates a signal to energize the solenoid 50. In response to the energization of the solenoid 5o, the valve stem 53, hence the valve member 52, permits communication between the passage in the hollow tubular member 21 and the chamber C. An air injection nozzle 17 is provided to supply secondary air into the space between the catalyst container 23 and 22. In this embodiment, supply of secondary air to the oxidizing catalyst bed B is ceased when the exhaust gas temperature exceeds the predetermined setting, and at the same time, the valve means operates to open the valve member 52 so as to discharge the greater portion of exhaust gases directly into the exhaust pipe 16 through the hollow tubular member 21. Therefore, the catalytic reaction of exhaust gases is extremely suppressed and generation of heat is minimized. It will thus be understood that, according to this embodiment, not only the oxidizing reaction is suppresssed to a minimum, but also the reducing reaction does not take place when the exhaust gas temperature is excessively high. Due to the fact that exhaust gases at an excessively high temperature do not pass through the catalyst beds, damage to the device and catalyst beds due to excessive heat can be reliably avoided even in the case in which the temperature of exhaust gases is unusually high as when the engine is operating under a heavy load condition.

Figure 5:
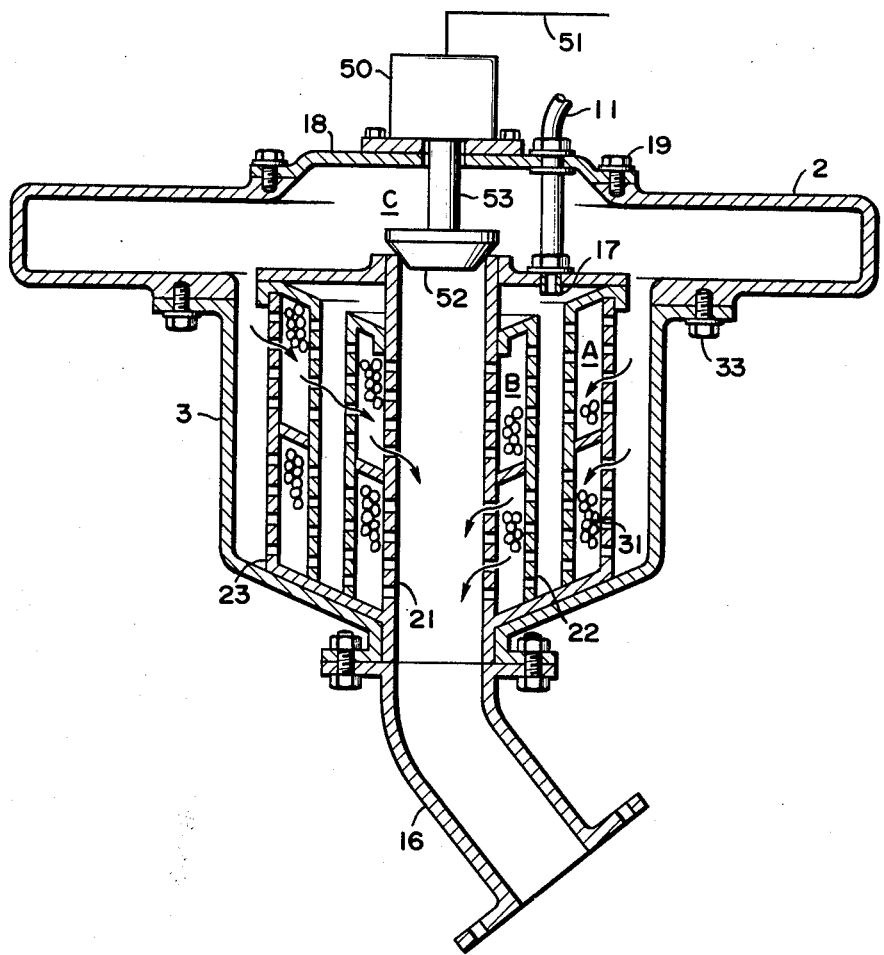

FIG. 5 shows a fourth embodiment of the present invention. The function and operation of this fourth embodiment are substantially the same as those of the third embodiment except that a partial modification is made in the third embodiment. Referring to FIG. 5, the reducing catalyst bed A and the oxidizing catalyst bed B are concentrically arranged, and exhaust gases pass through the reducing catalyst bed A disposed outside of the oxidizing catalyst bed B and then through the oxidizing catalyst bed B to be discharged in the exhaust pipe 16. In this embodiment too, the catalyst containers 23 and 22 have their bottom walls inclined gradually downward toward the center. Thus, catalyst beads are always urged mutually downstream and the weight loss of the catalyst beads due to impartation of vibrations can be minimized.

We claim:

1. A device for purifying exhaust gases from an internal combustion engine by reducing nitrogen oxides and oxidizing unburned gas components in the exhaust gases by means of a catalytic reaction, comprising:
   a. an exhaust manifold connected to said engine for receiving the exhaust gases therefrom;
   b. a hollow cylindrical casing vertically disposed from and integrally connected to said exhaust manifold;
   c. first and second cylindrical catalyst containers vertically disposed within said exhaust manifold and said hollow cylindrical casing, said first and second cylindrical catalyst containers being in series relation with respect to gas flow, said first and second cylindrical catalyst containers having first cylindrical walls and second cylindrical walls which have perforations thereon through which exhaust gases flow, whereby exhaust gas introduced in said exhaust manifold flows into said first container through said first wall perforations thereof, and out of said first container through said second wall perforations thereof, and then flows into said second container through said first wall perforations thereof and out of said second container through said second wall perforations thereof, said first container being charged with a reduction catalyst, said second container being charged with an oxidation catalyst, whereby said nitrogen oxides are reduced when passing through said reduction catalyst and said unburned gas components are oxidized when passing through said oxidation catalyst; and
   d. an exhaust pipe connected to said hollow cylindrical casing in such a manner that the inside of said second wall of said second container communicates with the inside of said exhaust pipe.

2. A device according to claim 1, wherein said first and second containers are co-axially disposed in spaced relationship.

3. A device according to claim 2, wherein said first and second containers are vertically aligned, said first container being disposed above said second container.

4. A device according to claim 3, wherein said first container is disposed within said exhaust manifold and said second container is disposed within said hollow cylindrical casing.

5. A device according to claim 3, wherein said first and second containers have the same diameter inner walls and the same diameter outer walls.

6. A device according to claim 3, further comprising means for injecting air into said exhaust manifold.

7. A device according to claim 6, wherein said injecting means has an air injecting nozzle disposed on a wall of said exhaust manifold, said nozzle being directed toward the inside of said second wall of said first container.

8. A device according to claim 2, wherein said first and second containers are concentrically disposed, said second container being disposed inside of said second wall of said first container.

9. A device according to claim 8, wherein said second container has an open end at the upstream end of said second cylindrical wall thereof, the inside of said second wall of said second container being selectively communicated with the inside of said exhaust manifold through said open end.

10. A device according to claim 9 further comprising means for selectively opening and closing said open end to permit said exhaust gases directly to flow into the inside of said second wall of said second container from the inside of said exhaust manifold or causing said exhaust gases to flow through said first container and said second container into the inside of said second wall of said second container.

11. A device according to claim 10, wherein said means for selectively opening and closing comprises a valve normally closing said open end, a solenoid device operably connected to said valve, a temperature sensor generating a signal corresponding to the temperature of the exhaust gases, and means for operating said solenoid device to open or close said valve in response to said signal.

12. A device according to claim 2, wherein said first and second containers have an inclined end wall so that said end wall declines downward in a direction to the axes of said containers.

13. A device according to claim 12, further comprising a shock absorbing means for mounting said first container on and within said exhaust manifold.

14. A device according to claim 8, wherein said first and second containers have partition walls therein to separate an upper part and a bottom part, said upper and bottom parts being charged with catalyst.

* * * * *